United States Patent
Minns et al.

[11] Patent Number: 5,966,490
[45] Date of Patent: Oct. 12, 1999

[54] CLAD OPTIC FIBER, AND PROCESS FOR PRODUCTION THEREOF

[75] Inventors: Richard A. Minns, Arlington; Hong Po, Sherborn; William C. Robinson, West Concord; Bennett H. Rockney, Westford; Ying Hua Zhang, Waltham, all of Mass.

[73] Assignee: SDL, Inc., San Jose, Calif.

[21] Appl. No.: 08/823,005

[22] Filed: Mar. 21, 1997

[51] Int. Cl.$^6$ .................................................. G02B 6/02
[52] U.S. Cl. ........................ 385/127; 385/128; 385/123; 385/126
[58] Field of Search .................... 385/127, 123, 385/124, 125, 126

[56] References Cited

U.S. PATENT DOCUMENTS

| | | | |
|---|---|---|---|
| 4,264,126 | 4/1981 | Sheem | 350/96.15 |
| 4,530,569 | 7/1985 | Squire | 350/96.34 |
| 4,710,605 | 12/1987 | Presby | 219/121 LJ |
| 4,798,438 | 1/1989 | Moore et al. | 350/96.15 |
| 4,815,079 | 3/1989 | Snitzer et al. | 372/6 |
| 4,842,359 | 6/1989 | Imoto et al. | 350/96.16 |
| 4,897,457 | 1/1990 | Nakamura et al. | 526/247 |
| 4,946,902 | 8/1990 | Bekarian et al. | 522/326.2 |
| 5,024,507 | 6/1991 | Minns et al. | 430/286 |
| 5,045,605 | 9/1991 | Buckmaster | 525/378 |
| 5,076,659 | 12/1991 | Bekarian et al. | 385/143 |
| 5,268,978 | 12/1993 | Po et al. | 385/33 |
| 5,277,730 | 1/1994 | Darsey et al. | 156/158 |
| 5,287,424 | 2/1994 | Sheem et al. | 385/39 |
| 5,373,576 | 12/1994 | Minns et al. | 385/125 |
| 5,377,293 | 12/1994 | Hatori et al. | 385/128 |
| 5,411,566 | 5/1995 | Poole et al. | 65/402 |
| 5,418,880 | 5/1995 | Lewis et al. | 385/123 |
| 5,484,822 | 1/1996 | Minns | 522/35 |
| 5,492,987 | 2/1996 | Minns | 526/245 |
| 5,534,558 | 7/1996 | Minns | 522/35 |

FOREIGN PATENT DOCUMENTS 402895 12/1990 European Pat. Off. .

*Primary Examiner*—Phan T. H. Palmer
*Attorney, Agent, or Firm*—W. Douglas Carothers, Jr.

[57] ABSTRACT

In a double-clad optical fiber comprising a core having an index of refraction $n_1$, an inner cladding surrounding the core and having an index of refraction $n_2$, and a first outer cladding surrounding the inner cladding and having an index of refraction $n_3$ (wherein $n_1 > n_2 > n_3$), the softness of the first outer cladding often renders it difficult to perform polishing or other mechanical operations on the end of the fiber. To reduce such difficulties it is advantageous to remove the first outer cladding from a limited end portion of the fiber, replacing it with a second outer cladding having an index of refraction $n_4$ (wherein $n_2 > n_4$) and a hardness which is greater than that of the first outer cladding.

31 Claims, 3 Drawing Sheets

CLAD OPTIC FIBER, AND PROCESS FOR PRODUCTION THEREOF

BACKGROUND OF THE INVENTION

This invention relates to a double-clad optical fiber and to a process for the production of such a fiber. More specifically, this invention relates to a double-clad optical fiber in which the outer cladding on an end portion of the fiber differs from that on the central portion of the fiber, thereby facilitating polishing or other mechanical manipulation of the fiber.

Double-clad optical fibers comprising a core having an index of refraction $n_1$, an inner cladding surrounding the core and having an index of refraction $n_2$, and an outer cladding surrounding the inner cladding and having an index of refraction $n_3$ (wherein $n_1 > n_2 > n_3$) are well known and are described, for example, in U.S. Pat. Nos. 4,815,079; 5,268,978; 5,373,576 and 5,418,880. Such double-clad optical fibers are used primarily as fiber lasers, and when so used the core is normally a single-mode core of laser material which is disposed within a multi-mode inner cladding.

The number of materials which are practical for use in the core of such a double-clad optical fiber is small, and accordingly the available values of $n_1$ are limited; a typical core material is a rare earth-doped silica, having $n_1 \sim 1.47$. The inner cladding is typically substantially pure silica, having $n_2 \sim 1.46$. Furthermore, as is well known to those skilled in the optical fiber art, the numerical aperture of a double-clad fiber depends upon the difference between the refractive indices of the inner and outer claddings (i.e., on the difference between $n_2$ and $n_3$) and since a large numerical aperture is desirable to facilitate introduction of light into the fiber, $n_3$ should be substantially less than $n_2$; in practice, $n_3$ should be less than about 1.43, and desirably not more than about 1.39. Furthermore, the outer cladding needs to have good adhesion to the inner cladding and low light attenuation to avoid loss of energy from the fiber. Finally, the material of the outer cladding must be such that a uniform thin layer of outer cladding can be formed at high speed upon the inner cladding.

The number of materials which can meet all these requirements for the outer cladding is extremely limited, and considerable research has been devoted to developing outer cladding materials. In practice, the only materials which meet the requirements of refractive index, adhesion, low attenuation and ease of application are radiation-cured polymers derived from highly fluorinated acrylates or similar monomers. For example, U.S. Pat. No. 5,024,507 describes the preparation of a cladding from a photopolymerizable composition comprising an unsubstituted or fluorosubstituted diacrylate monomer; a fluorinated monofunctional acrylate monomer in an amount of from about 2 to about 12 parts by weight per part by weight of the diacrylate monomer; a photoinitiator; and a viscosity modifying agent to increase the viscosity of the composition to about 1000 to about 15000 cP. Upon photocuring with ultra-violet radiation, the composition has a refractive index not greater than about 1.43, and preferably not greater than about 1.40. Similarly, U.S. Pat. Nos. 5,484,822; 5,492,987 and 5,534,558 describe a process, for cladding an optical fiber, in which a photoinitiator monomer, having both a photoinitiating group and an ethylenically unsaturated group, is reacted with a fluorosubstituted monomer having an ethylenically unsaturated group, thereby preparing a copolymer having pendant photoinitiating groups. This copolymer is then mixed with a fluorosubstituted diacrylate, thereby forming a photopolymerizable composition, which is coated on to the optical fiber and exposed to ultraviolet light, thereby curing the photopolymerizable composition to produce the cladding. Preferred claddings of this type can have refractive indices below 1.35. (For convenience, outer claddings produced using the composition of the aforementioned U.S. Pat. Nos. 5,024,507; 5,484,822; 5,492,987 and 5,534,558 will hereinafter be called "Fluoropolymer claddings".)

Although Fluoropolymer claddings meet the requirements of refractive index, adhesion, low attenuation and ease of application to fibers, they are, like most highly fluorinated polymers, soft, having hardness values not greater than about HDD-50, where "HDD" refers to the Hardness Durometer D grade hardness measured in accordance with American Society for Testing and Materials, Standard D2240 (usually abbreviated "ASTM D2240"); all hardness values quoted herein are measured at 23° C. The softness of Fluoropolymer claddings tends to cause problems during mechanical operations on the double-clad fibers. In most uses of such fibers as fiber lasers, it is necessary to provide one or both ends of the fiber with a reflective end surface, i.e., with an optically flat end surface extending perpendicular to the axis of the fiber, or with a similar, closely controlled end surface to allow reliable optical contact with an external mirror. Such an end surface is normally prepared by polishing the end of the fiber. Given the small diameter, of the order of 0.5 mm, and the consequent flexibility of the fiber, it is necessary to confine the fiber in a rigid holder during polishing, and in practice it is convenient to fix the end of the fiber (normally with a strong adhesive) within a capillary tube, with the end of the fiber essentially flush with the end wall of the tube, and to polish the ends of the fiber and the tube simultaneously. Unfortunately, the Fluoropolymer claddings are so soft, and the differences in coefficient of thermal expansion between them and glass capillaries so large, that during such a polishing operation the fiber tends to extrude out of the capillary and it is very difficult to control the exact form of the end surface produced; thus, a good reflective end surface is often not formed. Similar problems may occur during other mechanical operations on the fiber.

It has now been found that the aforementioned problems with Fluoropolymer clad fibers can be reduced or eliminated, without significant adverse effects on the optical properties of the double-clad fiber, by modifying the outer cladding on an end portion of the fiber.

SUMMARY OF THE INVENTION

Accordingly, this invention provides an optical fiber comprising:
a core having an index of refraction $n_1$;
an inner cladding surrounding the core and having an index of refraction $n_2$;
a first outer cladding surrounding the inner cladding on a central portion of the fiber, the first outer cladding having an index of refraction $n_3$ and a hardness $h_3$; and
a second outer cladding surrounding the inner cladding on at least one end portion of the fiber and contacting the first outer cladding, the second outer cladding having an index of refraction $n_4$ and a hardness $h_4$,
wherein:
$n_1 > n_2 > n_3$;
$n_2 > n_4$; and
$h_4 > h_3$.

This invention also provides an optical fiber assembly comprising an optical fiber of the invention as defined above, and a hollow tube surrounding, being substantially coaxial with and secured to, at least part of one end portion of the fiber, the tube having an end surface extending substantially perpendicular to the axis of the tube, and the fiber terminating adjacent the end surface of the tube.

Finally, this invention provides a process for the production of an optical fiber, which process comprises:

providing an optical fiber comprising a core having an index of refraction $n_1$; an inner cladding surrounding the core and having an index of refraction $n_2$; and a first outer cladding surrounding the inner cladding, the first outer cladding having an index of refraction $n_3$ and a hardness $h_3$;

removing the first outer cladding from at least one end portion of the fiber, thereby exposing the surface of the inner cladding; and thereafter forming on the at least one end portion a second outer cladding having an index of refraction $n_4$ and a hardness $h_4$, wherein:
$n_1 > n_2 > n_3$;
$n_2 > n_4$; and
$h_4 > h_3$.

DETAILED DESCRIPTION OF THE INVENTION

Figure 1:
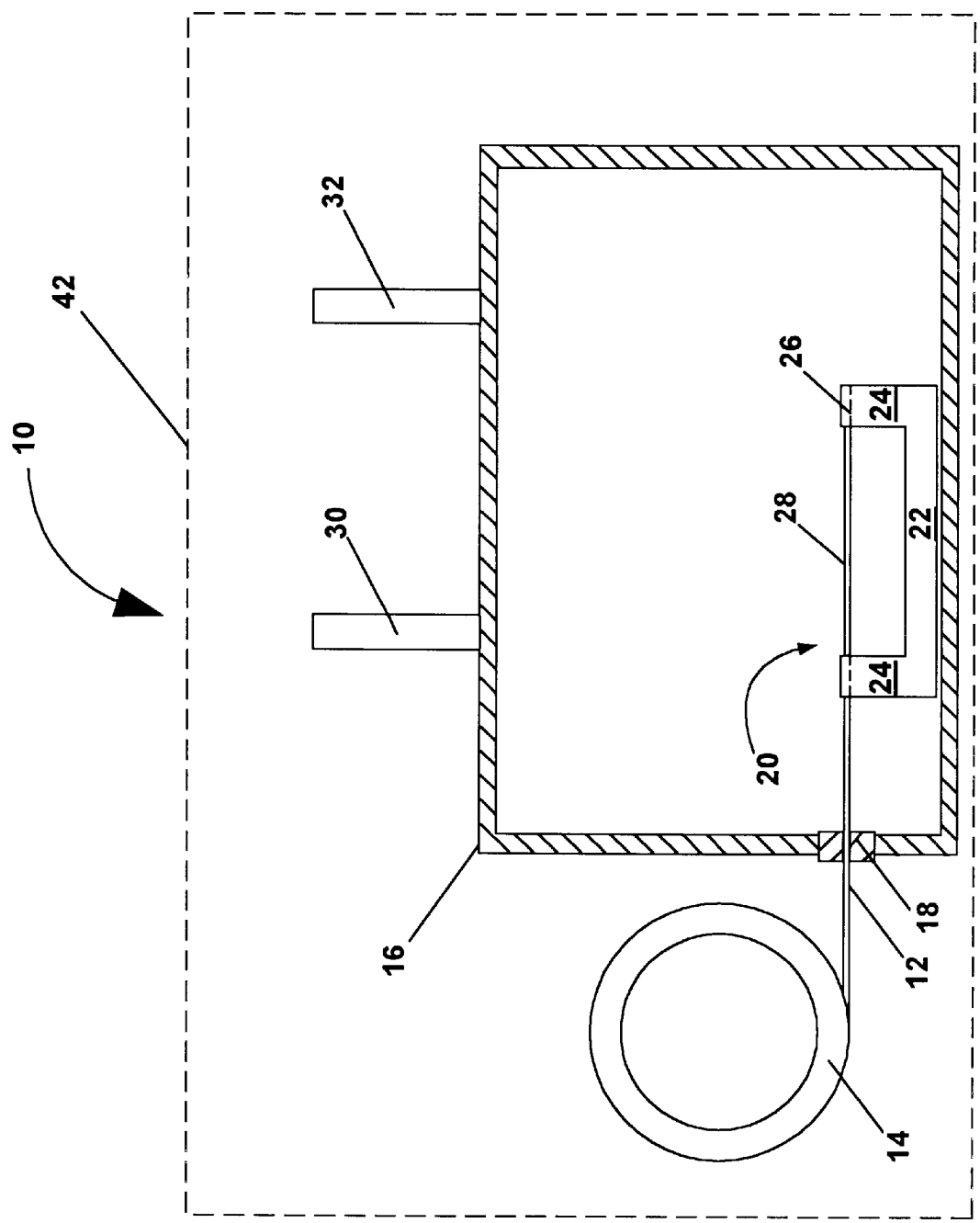
FIG. 1 of the accompanying drawings illustrates a preferred method and apparatus for removal of the first outer cladding from a double-clad fiber during a process of the present invention.

As described above, in the present invention the original ("first") outer cladding of a double-clad optical fiber is removed from a limited end portion at one or both ends of the fiber, and is replaced by a second outer cladding which is harder than the first outer cladding. Provision of this second outer cladding may involve a slight increase in light attenuation within the end portion of the fiber, but since the end portion can be short (desirably less than about 100 mm, and in most practical applications a few millimeters is sufficient) any slight increase in light attenuation is easily tolerable. The increased hardness of the second cladding reduces or eliminates the aforementioned problems, caused by the softness of the first outer cladding, during polishing or other mechanical manipulation of the fiber.

Since the outer claddings of the fiber of this invention are light-guiding, it is desirable to minimize light attenuation at the interface between the first and second outer claddings, by avoiding the formation of voids at this interface and shaping the interface to minimize light scattering. It has been found that light scattering at the interface can be minimized, and good adhesion between the first and second outer claddings achieved, by effecting the removal of the first outer cladding so as to taper the end portion of the first outer cladding, such that, after formation of the second outer cladding, the interface between the first and second outer claddings has substantially the form of part of the surface of a cone.

The present invention is not restricted to any particular method for the removal of the first outer cladding from the end portion(s) of the fiber. However, the method used should not damage the surface of the inner cladding, since such damage will adversely affect the optical properties of the fiber. For this reason, mechanical abrasion of the first outer cladding should normally be avoided, and the preferred method for removal of the first outer cladding is exposure of the end portion of the fiber to a plasma. The Fluoropolymers typically used to form the first outer cladding can readily be removed using a nitrogen/oxygen plasma generated by commercially available apparatus, as described in more detail below with reference to FIG. 1. As is well-known to those skilled in the optical fiber art, it is common to surround a light-transmitting cladding, such as the first outer cladding used in the present fiber, with a non-light-transmitting polymer coating which provides mechanical protection to the fiber. Such a polymer coating needs to be removed prior to or simultaneously with the first outer cladding from the end portion(s) of the fiber during the present process, and removal of the first outer cladding with a plasma has the advantage that it is often possible to remove the polymer coating and the first outer cladding in a single step.

For reasons discussed above, it is usually desirable to limit the length of the end portion clad with the second outer cladding to the minimum required for the polishing or other mechanical manipulated to be carried out on the fiber, and typically an end portion a few millimeters long will suffice. It is difficult to effect removal of only a few millimeters of the first outer cladding with a plasma. However, once the first outer cladding has been removed, the remaining part of the fiber, comprising only the core and inner cladding, is normally fragile enough to be broken without excessive damage to the remaining part of the fiber. Accordingly, it is within the scope of the present invention to effect removal of the first outer cladding from a long end portion of the fiber (say 50 mm or more) and to reduce the length of the end portion by breaking off the excess core and inner cladding to shorten the end portion prior to deposition of the second outer cladding thereon. Similarly, as discussed below, when forming an optical fiber assembly of the invention, it may be advantageous to provide on the fiber an end portion longer than will be required in the final assembly, so that the excess end portion can be used as a "handle" to hold the fiber in place relative to the hollow tube, and then to sever the excess end portion after the fiber is secured to the tube.

Figure 5:
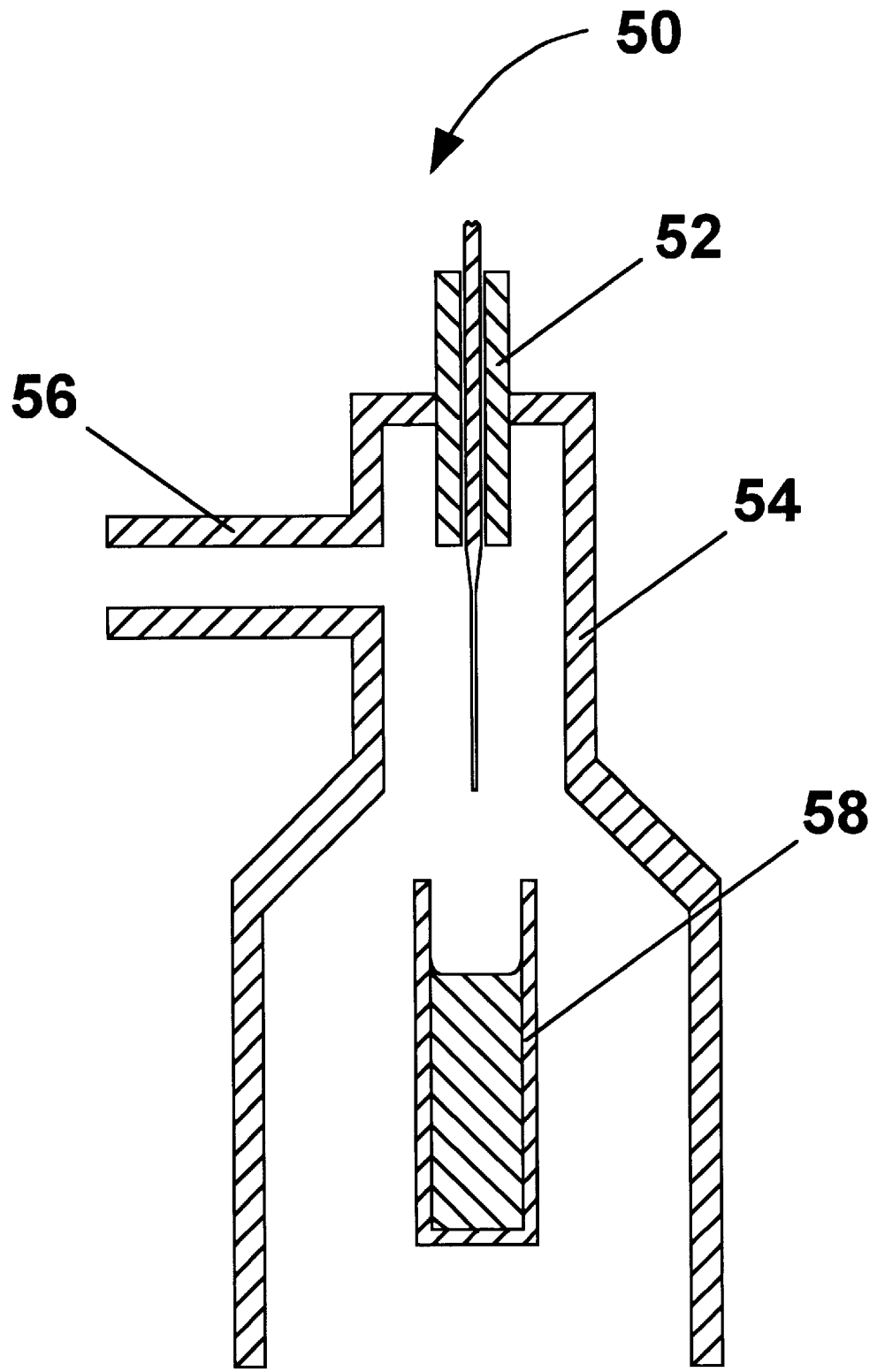
FIG. 5 shows schematically the preferred apparatus for applying the second outer cladding to stripped fiber of FIG. 2 to produce the fiber of FIG. 3.

The second outer cladding may be formed on the end portion(s) of the fiber by any method which can produce a layer with low light attenuation and good adhesion to the fiber. Conveniently, the formation of the second outer cladding is effected by dipping the end portion(s) of the fiber, from which the first outer cladding has been removed, into a solution or suspension containing the material from which the second outer cladding is to be formed, removing the end portion(s) of the fiber from the solution or suspension, and drying the solution or suspension adhering to the fiber to produce the second outer cladding adhering to the end portion(s) of the fiber. Repeated dipping of the fiber into the solution or suspension, with intermediate drying of the successive layers of second outer cladding may be needed, as described below in more detail with reference to FIG. 5.

As already indicated, in a typical fiber of the present invention, $n_1$ and $n_2$ are each greater than about 1.44, $n_3$ is not greater than about 1.39, and $n_4$ is preferably not greater than about 1.42 and desirably not greater than about 1.40. The refractive index of the second outer cladding can be as low as desired, although in practice the lowest refractive index of a commercial material with sufficient hardness appears to be about 1.29. Although any material having the desired refractive index and meeting the other requirements, such as low light attenuation and hardness, may be used to form the second outer cladding, the range of commercially available materials having all the necessary properties is limited, and it is preferred to form the second outer cladding from:

(a) a copolymer of:
at least one monomer selected from the group consisting of tetrafluoroethylene; chlorotrifluoroethylene; $R_fCFCF_2$, where $R_f$ is a primary perfluoroalkyl group with 1–5 carbon atoms; $R_gOCFCF_2$, where $R_g$ is $R_f$ or a primary perfluoroalkyl group containing ether oxygen and 4–12 carbon atoms; and
a fluorinated 1,3-dioxole, which may be alkyl substituted; or (b) a fluorine-containing thermoplastic resinous polymer which consists essentially of repeating units of a cyclic structure represented by the formula:

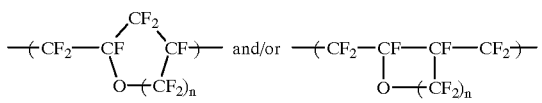

(where: n is 1 or 2); the polymer having a molecular weight such that the intrinsic viscosity thereof is at least 0.1.

Copolymers of type (a) are described in U.S. Pat. Nos. 4,530,569; 4,946,902; 5,045,605 and 5,076,659, and a specific polymer of this type, namely a copolymer of tetrafluoroethylene with perfluoro-2,2-dimethyl-1,3-dioxole, is sold by E.I. Du Pont de Nemours and Company, Wilmington, Del., under the Registered Trade Mark "TEFLON AF". This material is sold in various grades, and good results have been achieved using TEFLON AF 1600 (refractive index 1.31). TEFLON AF 2400 (refractive index 1.29) should also be suitable. Polymers of type (b) are described in U.S. Pat. No. 4,897,457, and in Feiring, Organofluorine Chemistry: Principles and Commercial Applications, pages 349–350 (Plenum Press), and a specific polymer of this type, prepared by cyclopolymerization of $CF_2=CFOCF_2CF_2CF=CF_2$ is sold by Asahi Glass Co., Ltd., of 2-1-2 Marunouchi, Chiyoda-ku, Tokyo 100, Japan, under the trade mark "CYTOP"; this material has a refractive index of 1.34.

The hardness $h_4$ of the second outer cladding is desirably at least about HDD-70. Of the aforementioned preferred cladding materials, TEFLON AF 1600 has a hardness of HDD-76 and CYTOP has a hardness of HDD-78; by way of comparison, the relatively soft Fluoropolymers preferred for use in the first outer cladding typically have a hardness of about HDD-40.

As already indicated, preferred materials for use in the first outer cladding of the fiber of the present invention are the Fluoropolymer claddings described in the aforementioned U.S. Pat. Nos. 5,024,507; 5,484,822; 5,492,987 and 5,534,558. Thus, conveniently, the first outer cladding comprises (i) a cured composition having a refractive index not greater than about 1.43, and comprising a copolymer containing repeating units derived from:

a) an unsubstituted or fluorosubstituted diacrylate monomer; and b) a fluorinated monofunctional acrylate monomer; or
(ii) a copolymer containing repeating units derived from:
a) a copolymer having pendant photoinitiating groups, this copolymer itself having repeating units derived from a photoinitiator monomer having both a photoinitiating group and an ethylenically unsaturated group, and repeating units derived from a fluoro- substituted monomer having an ethylenically unsaturated group; and
b) a fluorosubstituted diacrylate.

To form an optical fiber assembly of the present invention, the coated fiber with the second outer cladding present thereon is placed within a hollow tube and secured thereto. To ensure accurate control of the surface later formed on the end of the fiber, it is important to ensure that the fiber runs accurately along the axis of the tube. Conveniently, this is effected by passing the fiber through the tube until it protrudes from both ends of the tube, and clamping the portion of the fiber passing through the tube under tension between two clamps arranged to center the fiber accurately along the axis of the tube. An adhesive can then be injected, for example by means of a syringe, into the space between the fiber and the tube and allowed to cure. The adhesive may be of a type (for example, an epoxy adhesive) which is injected after mixing a curing agent therewith, or may be a radiation-curable adhesive, which is exposed to the curing radiation (typically ultra-violet radiation) while within the tube. Once the adhesive is cured and the fiber is secured within the tube, the fiber is unclamped and the portion of the fiber protruding from the tube can be severed so that the fiber terminates adjacent the end surface of the tube. The optical fiber assembly is then ready for polishing. In most cases, polishing is effected to produce parallel, optically flat end surfaces on the tube and the fiber. (Alternatively, at least in some cases, it may be possible to provide such parallel, optically flat surfaces by cutting through the tube and fiber using an abrasive cutting medium.) In other cases, it may be desirable to polish the end surfaces of the fiber and the tube into the form of part of the surface of a sphere which has a radius much greater than the diameter of the tube, this sphere being centered on the axis of the tube. This form of polishing is capable of providing reliable optical contact of the fiber with an external mirror. As already noted, the presence of the relatively hard second outer cladding on the end portion of the fiber allows for precise control of the form of the ends of the fiber and tube after polishing, and reduces or eliminates the problems encountered when one attempts to polish the end surface of a fiber completely clad with a soft first outer cladding.

Apart from the provision of the second outer cladding on the end portion(s), the fibers used in the present invention can be of conventional construction. Thus, desirably the core is a substantially single-mode core comprised of laser material, the inner cladding is a multi-mode cladding, and there is substantially no space between the inner and outer claddings. The core preferably comprises silica doped with a rare earth element, desirably neodymium, ytterbium or erbium.

A preferred optical fiber and process of the present invention will now be described in more detail, though by way of illustration only, with reference to the accompanying drawings, to show details of particularly preferred materials and techniques used in the optical fiber, optical fiber assembly and process of the present invention. For ease of illustration and comprehension, the accompanying drawings are not strictly to scale; in particular, the dimensions of the optical fiber and the various layers therein are greatly exaggerated compared to the length of the end section of the fiber.

FIG. 1 illustrates a preferred method and apparatus for removal of the first outer cladding from a double-clad fiber during a process of the present invention, this removal being effected using an apparatus, generally designated 10, which exposes an end section of the fiber to a plasma etch. In the apparatus 10, the major portion of a optical fiber 12 is wrapped around a reel 14, which is supported by a support member (not shown) adjacent an "air-tight" enclosure 16, which is formed from a polymer essentially transparent to microwaves. However, one end of the fiber 12 extends tangentially from the reel 14, passes through a small aperture in a grommet 18 and is held horizontally within the enclosure 16 by means of a fiber support member, generated designated 20. The fiber support member 20, which is formed from a single piece of polytetrafluoroethylene, is essentially C-shaped, having a horizontal limb 22, which rests upon the floor of the enclosure 16, and two vertical limbs 24, which extend upwardly from the ends of the horizontal limb 22, and which are provided at their upper ends with grooves 26, in which rests an end portion 28 of the fiber 12. The enclosure 16 is provided with a vacuum line 30 and (depending upon what gas is being employed for stripping the first outer cladding) may also be provided with a gas inlet 32.

Figure 2:
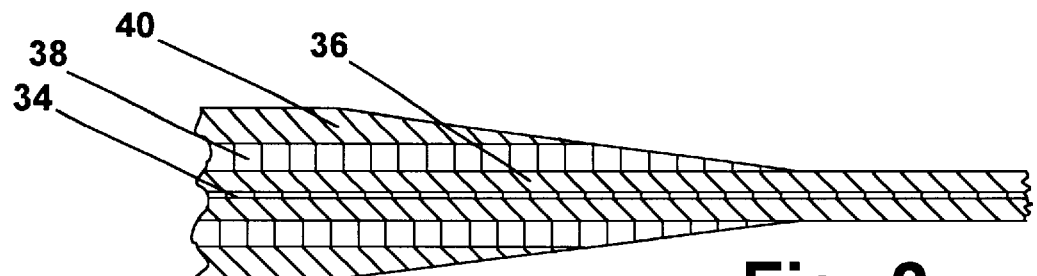
FIG. 2 shows the double-clad fiber after treatment in the apparatus of FIG. 1.

As best seen in FIG. 2, the fiber 12 comprises a single-mode core 34, which is of circular cross-section, approximately 9 µm in diameter, formed from a ytterbium(III) doped silica, and having a refractive index of approximately 1.47. The core 34 is surrounded by an inner cladding 36, which is formed from silica, has a refractive index of approximately 1.46, and is of rectangular cross-section, approximately 330×170 µm. The inner cladding 36 is itself surrounded by a first outer cladding 38, which is a fluoropolymer formed by polymerization of a mixture of a fluorinated diacrylate monomer, a fluorinated monoacrylate monomer, a free radical polymerization initiator and a viscosity modifying agent, as described in the aforementioned U.S. Pat. No. 5,024,507; this fluoropolymer has a refractive index of approximately 1.38. Finally, the first outer cladding 38 is itself surrounded by a coating 40, which provides mechanical protection to the remaining parts of the optical fiber 12, this coating 40 being formed from a polyurethane acrylate.

The apparatus 10 shown in FIG. 1 is used to remove both the coating 40 and the first outer cladding 38 from the end section 28 of the fiber 12 by plasma etching; the plasma is generated by exposing low pressure gas to microwave radiation. For this purpose, the reel 14 and the enclosure 16 are placed within the cavity (indicated schematically by broken rectangle 42 in FIG. 1) of a microwave oven; a Plasma-Preen II oven, sold commercially by Plasmatic Systems of North Brunswick, N.J., has been found satisfactory for this purpose. Because the floor of the microwave oven cavity is a metal plate, it is necessary to space the fiber a distance of $\lambda/4$ above the oven floor (where $\lambda$ is the wavelength of the microwave radiation used), and the fiber support member 20 achieves the necessary spacing of about 30 mm. The gas used for etching is a nitrogen/oxygen mixture containing water vapor at a pressure of about 1–2 Torr; water-saturated air is generally satisfactory though other nitrogen/oxygen/water vapor mixtures may be used if desired. (Furthermore, as will readily be apparent to those skilled in the etching art, the etching conditions required are a function of the compositions of the coating 40 and the first outer cladding 38 and may need to be varied depending upon the exact materials used in these components of the fiber 12.) To effect etching, the reel 14 and the enclosure 16, having the fiber 12 and the fiber support member 20 already positioned therein, are placed within the microwave oven cavity 42; the enclosure 16 is flushed with damp air (provided by passing air through a bubbler) or another desired gas via the gas inlet 32 before the reel and the enclosure are placed within the oven cavity. The vacuum line is connected to a vacuum pump, and the pressure within the enclosure 16 reduced to the required value. The microwave oven is switched on for the period necessary to remove the coating and first outer cladding. With the specific coating and first outer cladding mentioned above, it has been found that from about 1 to about 5 minutes treatment with a Plasma-Preen II oven operating at full power suffices to remove both the coating and the first outer cladding cleanly, and the progress of the etching can be followed visually; the plasma is initially violet, become blue-white while etching is taking place, and then returns to a violet color when the etching is complete. Very clean removal of the coating and the first outer cladding from the end section of the fiber can be achieved without any damage to the silica inner cladding, which is essentially immune to etching under the conditions already described.

As best seen in FIG. 2, because of the geometry of the apparatus used, after etching the first outer cladding 38 does not terminate abruptly at the junction between the end section 28 and the remainder of the optical fiber 12; rather, after etching, the surface of the first outer cladding 38 has essentially the form of part of a cone, with the thickness of the first outer cladding diminishing gradually from its initial value to zero. It has been found that this tapered form of first outer cladding promotes good adhesion of the second outer cladding to the first, and also helps to reduce light losses at the boundary between the two outer claddings.

The apparatus shown in FIG. 1 will normally be of such a size that the coating and first outer cladding are removed from the fiber over a length of several centimeters. Since this length is much larger than the length of the end section needed in the final optical fiber assembly shown in FIG. 4, and since it is somewhat difficult to handle a fragile stripped end section several centimeters in length, it is convenient to break off (either manually or mechanically) the excess stripped section, thereby reducing the length of the stripped section to about 20–30 mm prior to deposition of the second outer cladding thereon.

As already mentioned, the preferred method for deposition of the second outer cladding is to immerse the stripped end section of the fiber in a solution or dispersion of the material used to form the second outer cladding, then allow the film of solution or dispersion to dry to form a coherent layer of the second outer cladding adhering to the end section. The preferred apparatus (generally designated 50) for carrying out this procedure is shown schematically in FIG. 5. This apparatus comprises a vertical capillary tube 52 through which the stripped fiber shown in FIG. 2 passes, with the whole end section of the fiber projected vertically downwardly from the lower end of the tube 52. The tube 52 is fixedly secured in, or integral with, a "hood" tube 54, which extends downwardly below the end of tube 52 and thus surrounds the end section of the fiber. The tube 52 is provided with a side arm 56, through which a stream of warm air or other gas is continuously passed. The temperature of the air or other gas may vary depending upon the nature of the solution or suspension used to form the second outer cladding; the preferred TEFLON AF and CYTOP polymers are normally applied in the form of solutions in highly volatile perfluorinated hydrocarbon solvents, and for evaporation of such solvents air at about 30–35° C. suffices to rapidly evaporate the solvent.

Once the fiber has been placed in position within the tube 52 and the warm air stream turned on, a test tube 58 or similar vessel, containing the solution or suspension used to form the second outer cladding, is raised vertically within the tube 54 so that the whole of the end section of the fiber is completely immersed (it is of course essential that no gap be left between the first and second outer claddings), and the vessel is then lowered and the fiber allowed to dry in the stream of warm air while still held within the capillary tube 52. For applying the preferred TEFLON AF 1600 polymer, it is preferred to form a 5% w/v solution of the solid polymer in FLUORINERT (Registered Trade Mark) FC-77 solvent (this solvent is sold commercially by Minnesota Mining and Manufacturing Company, Minneapolis Minn., and is stated to be contain perfluorocarbons); the CYTOP polymer may be applied from similar fluorinated solvents. When dipping the fiber in the solution or suspension, the fiber should not be allowed to touch the wall of he test tube, since this may adversely affect the uniformity of the second outer cladding, and a highly uniform second outer cladding is desirable. In most cases, depending partly upon the viscosity of the solution or suspension used, the dipping procedure needs to be repeated several times to build up the required thickness of second outer cladding; with the fiber having the dimensions previously specified, which requires a maximum second outer cladding thickness of about 100–150 μm, and using the preferred TEFLON AF and CYTOP solutions (which have relatively low viscosities), sixteen or more dipping procedures and intermediate drying steps may be required At the conclusion of this process, the stripped fiber shown in FIG. 2 has been converted to the form shown in FIG. 3, in which the second outer cladding 44 is formed on the end section of the fiber. (The second outer cladding will also cover the end of the fiber, but this is essentially irrelevant, since any second outer cladding on the end of the fiber will either be removed by later shortening of the end section or will easily be removed during a polishing operation.)

Figure 3:
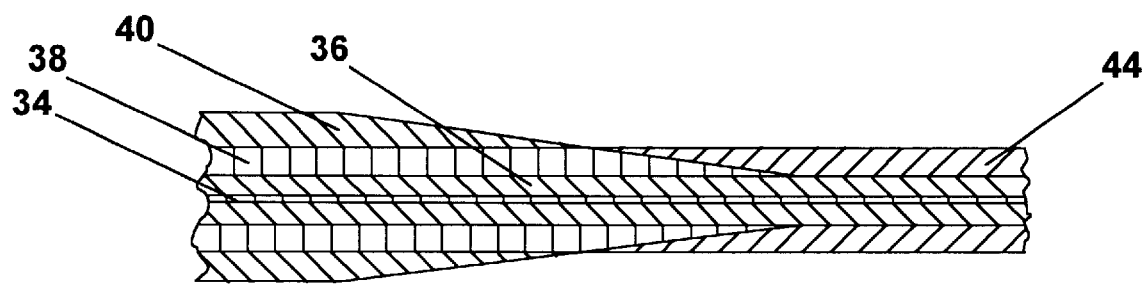
FIG. 3 shows the double-clad fiber of FIG. 2 after formation of the second outer cladding thereon.

The reclad fiber of FIG. 3 is now ready for incorporation into an optical fiber assembly of the present invention. The preferred technique for forming such an assembly is to pass the reclad fiber through the hollow tube (a capillary tube) which will form part of the final assembly so that part of the end section of the fiber protrudes from one end of the tube while the central section of the fiber protrudes from the other end of the tube, the tube being secured in a fixed position. The fiber is then clamped by means of two clamps adjacent the opposed ends of the tube so that the fiber is accurately aligned along the axis of the tube, and an adhesive is injected into the gap between the fiber and the tube and allowed to cure, thus permanently securing the fiber coaxially within the tube. The adhesive used may be of a type which is self-curing, for example an epoxy adhesive to which a curing agent has been added, or the adhesive may be of a type which cures by exposure to appropriate radiation, for example an ultra-violet curable adhesive, in which case it is necessary to expose the adhesive to the curing radiation while the adhesive is present within the tube. Radiation-curable adhesives have the advantage that they are generally of lower viscosity than epoxy adhesives, and hence are easier to introduce into the narrow gap between the fiber and the tube; also, radiation-curable adhesives can be stored for long periods without curing, so that, for example, one can prepare a batch of adhesive sufficient for a large number of optical fiber assemblies, whereas with an epoxy adhesive it is necessary to mix adhesive and curing agent immediately before use.

Figure 4:
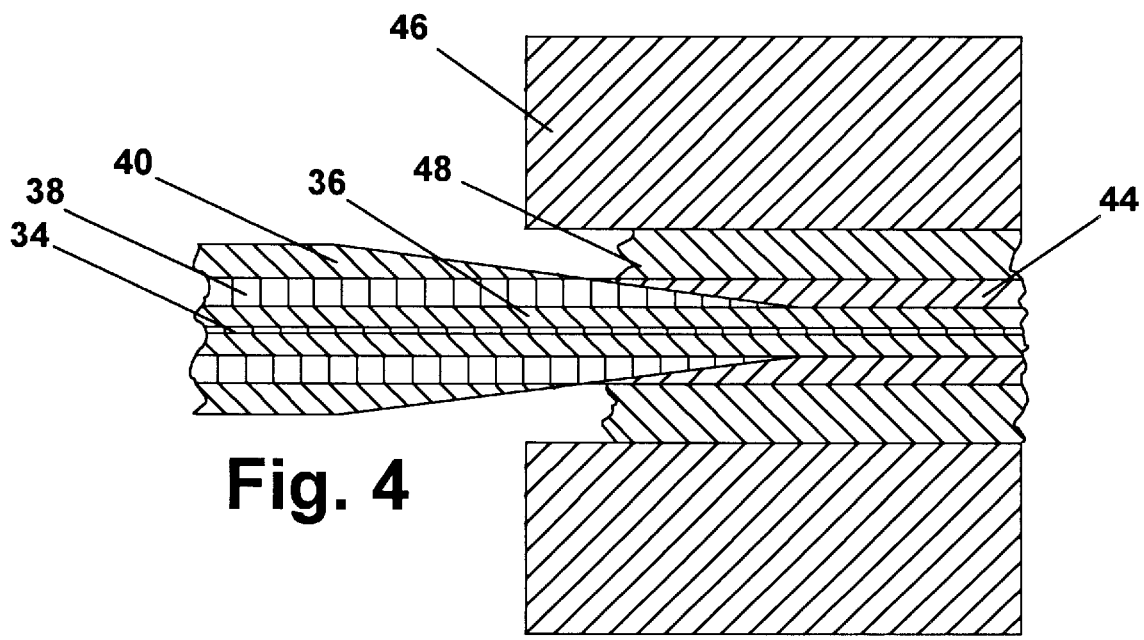
FIG. 4 shows the double-clad fiber of FIG. 3 being mounted in an optical fiber assembly of the present invention.

After the optical fiber has thus been secured within the tube, the clamps holding the fiber are removed, and that part of the end portion of the fiber protruding from the tube is broken off, so that the fiber terminates adjacent the end surface of the tube. This produces an optical fiber assembly as shown in FIG. 4, in which the fiber 12 is secured centrally within a tube 46 by means of cured adhesive 48. Note that it is not necessary for the end portion 28 of the fiber 12 carrying the second outer cladding 44 to extend the full length of the tube 46, and indeed it is generally undesirable for the second outer cladding to do so, since this increases the attenuation of the fiber 12; an end portion 28 a few millimeters in length is normally sufficient to avoid any tendency for the fiber 12 to extrude from the end of the tube 46 during polishing or other mechanical manipulation.

The optical fiber assembly shown in FIG. 4 is ready for the formation of a reflective end surface on the fiber 12. Such a reflective end surface can be produced by contacting the end surface of the tube 46, having the fiber 12 secured therein, with a grinding wheel or similar abrasive device and polishing the ends of the tube and the fiber until parallel, optically flat surfaces are formed on the two ends. (Alternatively, as noted above, a large radius spherical surface may be provided on the ends of the fiber and the tube.) It should be noted that, if excess fiber protruding from the end of the tube is broken away after securing the fiber within the tube (as described above), such breaking away may cause damage to a part of the fiber within the tube, such damage typically extending axially along the fiber for a distance approximately equal to, or perhaps somewhat greater than, the diameter of the inner cladding of the fiber. To ensure that the reflective end surface is formed on an undamaged portion of the fiber, so that there are no heterogeneities left within the fiber which might scatter light, and thus adversely affect the properties of the fiber, care should be taken to grind away a length of fiber sufficient to remove the damaged portion. Since the inner claddings of optical fibers normally have diameters substantially less than 1 mm, removal of about 1 mm of fiber, which is readily practicable with conventional grinding/polishing apparatus, will suffice to remove any damaged portion.

Alternatively, the reflective end surface may be formed by cutting the fiber and tube at a point spaced from the ends thereof, using an abrasive cutting wheel or similar device. Such cutting has the advantage that it is not necessary to remove the excess fiber protruding from the tube before beginning cutting, so there is less risk of damaging the fiber.

The process of the invention described above only treats one end of the fiber. However, it will readily be apparent to those skilled in the art that, if it is necessary to form reflective end surfaces on both ends of the fiber, the present process can readily be repeated to treat the other end of the fiber.

From the foregoing, it will be seen that the present invention allows reflective end surfaces to be formed on double-clad optical fibers without the problems previously encountered because of the relatively soft outer claddings normally used in such double-clad fibers. The present invention can be carried out in a simple manner using relatively inexpensive, commercially available apparatus and materials, and does not require an excessive amount of skilled labor.

We claim:

1. An optical fiber comprising:
   a core having an index of refraction $n_1$;
   an inner cladding surrounding the core and having an index of refraction $n_2$;

a first outer cladding surrounding the inner cladding on a central portion of the fiber, the first outer cladding having an index of refraction $n_3$ and a hardness $h_3$; and a second outer cladding surrounding the inner cladding on at least one end portion of the fiber and contacting the first outer cladding, the second outer cladding having an index of refraction $n_4$ and a hardness $h_4$, wherein:

$n_1 > n_2 > n_3$;
$n_2 > n_4$; and
$h_4 > h_3$.

2. An optical fiber according to claim 1 wherein the second outer cladding comprises:

(a) a copolymer of:
at least one monomer selected from the group consisting of tetrafluoroethylene; chlorotrifluoroethylene; $R_fCFCF_2$, where $R_f$ is a primary perfluoroalkyl group with 1–5 carbon atoms; $R_gOCFCF_2$, where $R_g$ is $R_f$ or a primary perfluoroalkyl group containing ether oxygen and 4–12 carbon atoms; and
a fluorinated 1,3-dioxole, which may be alkyl substituted; or (b) a fluorine-containing thermoplastic resinous polymer which consists essentially of repeating units of a cyclic structure represented by the formula:

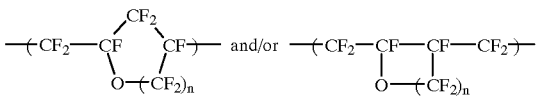

(where: n is 1 or 2); the polymer having a molecular weight such that the intrinsic viscosity thereof is at least 0.1.

3. An optical fiber according to claim 2 wherein the second outer cladding comprises a copolymer of tetrafluoroethylene with perfluoro-2,2-dimethyl-1,3-dioxole.

4. An optical fiber according to claim 2 wherein the second outer cladding comprises a cyclic polymer of $CF_2=CFOCF_2CF_2CF=CF_2$.

5. An optical fiber according to claim 1 wherein the core is a substantially single-mode core comprised of laser material, the inner cladding is a multi-mode cladding, and there is substantially no space between the inner and outer claddings.

6. An optical fiber according to claim 5 wherein the core comprises silica doped with a rare earth element.

7. An optical fiber according to claim 6 wherein the core comprises silica doped with at least one of neodymium, ytterbium and erbium.

8. An optical fiber assembly comprising an optical fiber according to claim 1, and a hollow tube surrounding, substantially coaxial with and secured to, at least part of one end portion of the fiber, the tube having an end surface extending substantially perpendicular to the axis of the tube, and the fiber terminating adjacent the end surface of the tube.

9. A optical fiber assembly according to claim 8 wherein the tube is secured to the fiber by an adhesive which fills the space between the fiber and the tube.

10. A optical fiber assembly according to claim 8 wherein the fiber has an end surface parallel to the end surface of the tube, the end surfaces of the fiber and the tube both being polished optically flat.

11. An optical fiber according to claim 1 wherein the length of the or each end section on which the second outer cladding is present is not more than about 100 mm.

12. An optical fiber according to claim 1 wherein the first outer cladding comprises a cured composition having a refractive index not greater than about 1.43, and comprising a copolymer containing repeating units derived from:

a) an unsubstituted or fluorosubstituted diacrylate monomer; and b) a fluorinated monofunctional acrylate monomer.

13. An optical fiber according to claim 1 wherein the first outer cladding comprises a copolymer containing repeating units derived from:

a) a copolymer having pendant photoinitiating groups, this copolymer itself having repeating units derived from a photoinitiator monomer having both a photoinitiating group and an ethylenically unsaturated group, and repeating units derived from a fluorosubstituted monomer having an ethylenically unsaturated group; and b) a fluorosubstituted diacrylate.

14. An optical fiber according to claim 1 wherein the or each interface between the first and second outer claddings has substantially the form of part of the surface of a cone.

15. An optical fiber according to claim 1 wherein $n_1$ and $n_2$ are each greater than about 1.44, $n_3$ is not greater than about 1.39, and $n_4$ is not greater than about 1.42.

16. An optical fiber according to claim 1 wherein $h_3$ is less than about HDD-60 and $h_4$ is at least about HDD-70.

17. A process for the production of an optical fiber, which process comprises:

providing an optical fiber comprising a core having an index of refraction $n_1$; an inner cladding surrounding the core and having an index of refraction $n_2$; and a first outer cladding surrounding the inner cladding, the first outer cladding having an index of refraction $n_3$ and a hardness $h_3$;

removing the first outer cladding from at least one end portion of the fiber, thereby exposing the surface of the inner cladding; and thereafter forming on the at, least one end portion a second outer cladding having an index of refraction $n_4$ and a hardness $h_4$, wherein:

$n_1 > n_2 > n_3$;
$n_2 > n_4$; and
$h_4 > h_3$.

18. A process according to claim 17 wherein the second outer cladding comprises:

(a) a copolymer of:
at least one monomer selected from the group consisting of tetrafluoroethylene; chlorotrifluoroethylene; $R_fCFCF_2$, where $R_f$ is a primary perfluoroalkyl group with 1–5 carbon atoms; $R_gOCFCF_2$, where $R_g$ is $R_f$ or a primary perfluoroalkyl group containing ether oxygen and 4–12 carbon atoms; and
a fluorinated 1,3-dioxole, which may be alkyl substituted; or (b) a fluorine-containing thermoplastic resinous polymer which consists essentially of repeating units of a cyclic structure represented by the formula:

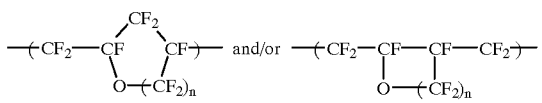

(where: n is 1 or 2); the polymer having a molecular weight such that the intrinsic viscosity thereof is at least 0.1.

19. A process according to claim 18 wherein the second outer cladding comprises a copolymer of tetrafluoroethylene with perfluoro-2,2-dimethyl-1,3-dioxole.

20. A process according to claim 18 wherein the second outer cladding comprises a cyclic polymer of $CF_2=CFOCF_2CF_2CF=CF_2$.

21. A process according to claim 17 further comprising placing an end portion of the fiber, having the second outer cladding thereon, within a hollow tube, the tube having an end surface extending substantially perpendicular to the axis of the tube, and securing the fiber to the tube so that the fiber terminates adjacent the end surface of the tube.

22. A process according to claim 21 wherein the fiber is secured to the tube by introducing an adhesive into the tube and curing the adhesive after the end portion of the fiber has been placed within the tube.

23. A process according to claim 21 further comprising polishing the end surfaces of the tube and the fiber optically flat.

24. A process according to claim 17 wherein the or each end section on which the second outer cladding is formed has a length of not more than about 100 mm.

25. A process according to claim 17 wherein the removal of the first outer cladding is effected so as to taper the end portion(s) of the first outer cladding, such that, after formation of the second outer cladding, the or each interface between the first and second outer claddings has substantially the form of part of the surface of a cone.

26. A process according to claim 17 wherein $n_1$ and $n_2$ are each greater than about 1.44, $n_3$ is not greater than about 1.39, and $n_4$ is not greater than about 1.42.

27. A process according to claim 17 wherein the first outer cladding comprises a cured composition having a refractive index not greater than about 1.43, and comprising a copolymer containing repeating units derived from:
   a) an unsubstituted or fluorosubstituted diacrylate monomer; and
   b) a fluorinated monofunctional acrylate monomer.

28. A process according to claim 17 wherein the first outer cladding comprises a copolymer containing repeating units derived from:
   a) a copolymer having pendant photoinitiating groups, this copolymer itself having repeating units derived from a 5 photoinitiator monomer having both a photoinitiating group and an ethylenically unsaturated group, and repeating units derived from a fluorosubstituted monomer having an ethylenically unsaturated group; and
   b) a fluorosubstituted diacrylate.

29. A process according to claim 17 wherein $h_3$ is less than about HDD-60 and $h_4$ is at least about HDD-70.

30. A process according to claim 17 wherein the removal of the first outer cladding is effected by exposing that cladding to a plasma.

31. A process according to claim 17 wherein the formation of the second outer cladding is effected by dipping the end portion(s) of the fiber, from which the first outer cladding has been removed, into a solution or suspension containing the material from which the second outer cladding is to be formed, removing the end portion(s) of the fiber from the solution or suspension, and drying the solution or suspension adhering to the fiber to produce the second outer cladding adhering to the end portion(s) of the fiber.

* * * * *